July 1, 1941.  E. A. JOHNSTON  2,247,687
TRACTOR MOUNTED HARVESTER
Filed Feb. 15, 1939  3 Sheets-Sheet 1

Inventor
Edward A. Johnston
By Paul O. Pippel
Att'y.

July 1, 1941.  E. A. JOHNSTON  2,247,687
TRACTOR MOUNTED HARVESTER
Filed Feb. 15, 1939   3 Sheets-Sheet 3

Inventor
Edward A. Johnston
By Paul O. Pippel
Atty.

Patented July 1, 1941

2,247,687

UNITED STATES PATENT OFFICE 2,247,687

TRACTOR MOUNTED HARVESTER

Edward A. Johnston, Chicago, Ill., assignor to International Harvester Company, a corporation of New Jersey Application February 15, 1939, Serial No. 256,445

16 Claims. (Cl. 56—11)

This invention relates to a tractor mounted harvester. More specifically, it relates to a harvester of the type adapted to harvest cotton, the harvester unit itself being mounted rearwardly of the rear axle of a tractor and the plant guiding elements of the picker being positioned forwardly of the rear axle.

In the copending application of Edward A. Johnston, Serial No. 175,199, filed November 18, 1937, there is shown a cotton picker and harvester unit pivotally suspended from a point rearward of the rear axle of a tractor. The guiding elements for enabling the plants to be brought into position for picking are shown as substantially beneath the rear axle of the tractor. It has been found desirable to make these guiding elements of somewhat larger size. Accordingly, it is impossible to position them under the axle of the tractor. The best position for these guiding elements seems to be somewhat in front of the axle, and in such a case there is the problem of properly mounting these elements on the tractor as well as of connecting the elements to the harvester and picker unit so that there can be some coordinated adjustment of the guiding elements and the harvester unit.

An object of the present invention is to provide an improved harvester construction.

A further object is the provision of a tractor mounted harvester, of which the harvesting unit is positioned rearwardly of the axle and the elements for guiding the plants into the harvester unit are positioned forwardly of the axle.

A further object is to provide a construction in which a cotton harvester unit, movably supported on the tractor rearwardly of the rear axle, and a plant guiding unit, movably supported forwardly of the rear axle, have interconnections which permit a coordinated vertical adjustment of both the harvester unit and the plant guiding unit with respect to the tractor.

According to the present invention, a cotton harvester unit is pivotally supported on a tractor rearwardly of the rear axle by means of a lever. Plant guiding units are positioned forwardly of the rear axle and are movably connected to the tractor by means of parallel links. Another link is connected at one end pivotally to one of the parallel links and at the other end to the lever supporting the harvester unit by means of an elongated slot. Through the interconnection of the harvester unit and the plant guiding units provided in this link, vertical adjustment of the harvester unit effects a similar vertical adjustment of the plant guiding units, and yet the plant guiding units have a certain independent vertical movement.

Figure 1:
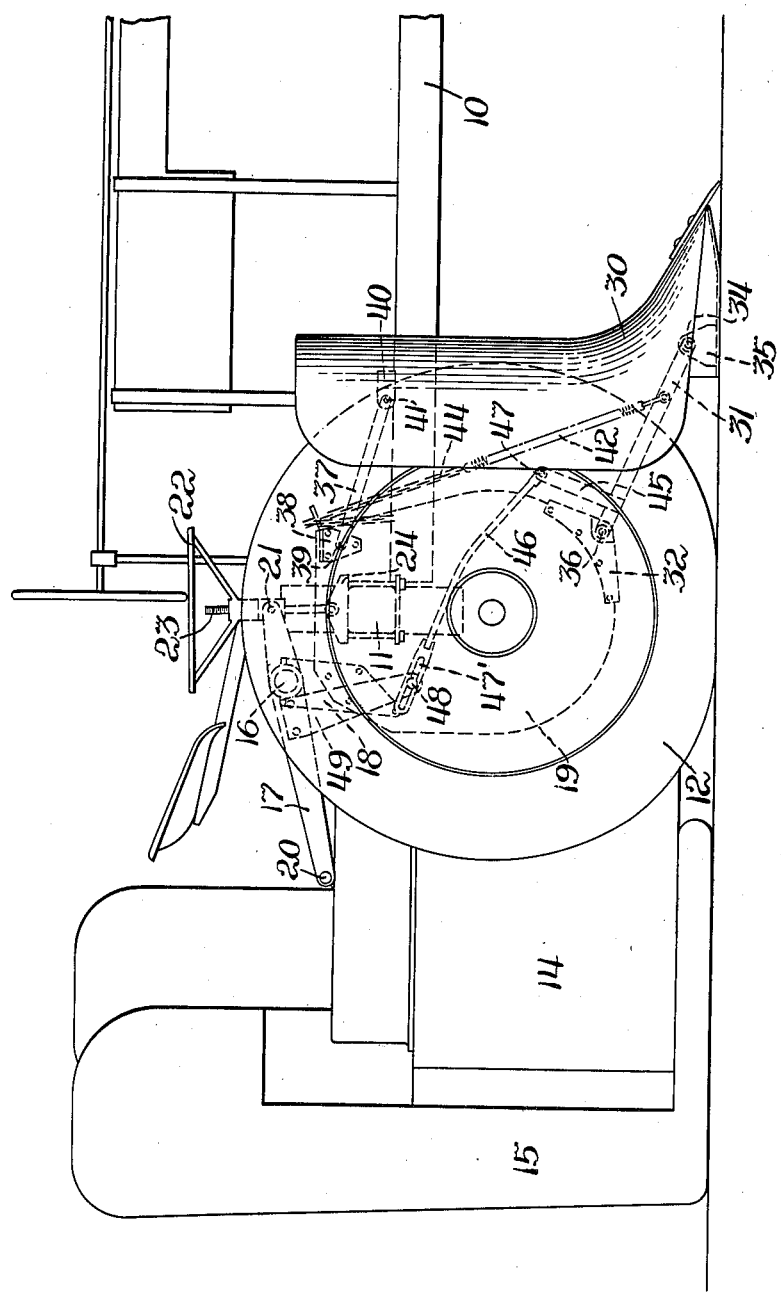
Figure 1 is a side view, showing a portion of a tractor and harvester, and plant guiding units supported adjacent the rear axle of the tractor.

Numeral 10 represents a tractor of the row crop type, of which only the rear portion is shown. The tractor has a high rear axle 11, at the ends of which are connected wheels 12 and 13. A cotton harvester unit 14 is positioned rearwardly of the rear axle 11. A vertical elevator housing 15 is shown connected to the rear of the harvester 14. For further details of the harvester unit itself, reference is made to the aforementioned copending application of Edward A. Johnston. This application also discloses in detail the way in which the harvester unit 14 is supported from the tractor. A description of this mode of supporting will now be given. A lever 17 is pivotally supported at a mid-point on a shaft 16 supported at one end on a bracket 18 secured in turn to a plate 19, forming part of the axle housing structure of the tractor. The lever 17 is actually composed of a pair of members rigidly secured in spaced parallel relation to the shaft 16, as shown in the copending Johnston application. One end of the lever 17 pivotally supports the harvester unit 14, as at 20. The other end of the lever is connected, as at 21, under a hand wheel 22 threaded to a rod 23 pivotally connected to a member 24 bolted to the rear axle 11. By adjustment of the hand wheel 22 along the bolt 23, the lever 17 is pivoted and accordingly moves the harvester unit up and down. An adjustable link 25 connects a lower point 26 of the harvester unit and the plate 19 by means of a piece 27. It is intended that the length of the link 25 be substantially the length of the arm of the lever 17 supporting the harvester unit 14, so that the harvester is in effect connected to the tractor by means of parallel links and will have satisfactory vertical movement with respect to the tractor. The weight of the harvester unit 14 is counterbalanced by means of a spring 28 secured at one end to the tractor 10 and at the other end to an arm 29 rigid with the lever 17.

Figure 4:
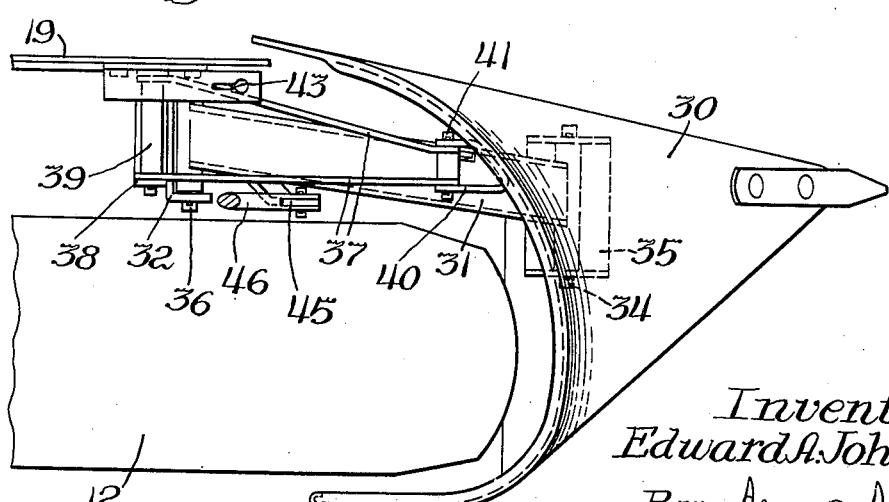

The plant guiding units are connected to the tractor in somewhat the same way. Figure 1 shows the manner in which an outer plant guiding unit 30 is supported. A link 31 connects a lower point of the unit 30 and a lower point of the plate 19 by means of a bracket 32. This link 31 is of channel shape, as may be seen in Figure 4, and is connected to the lower point of the plant guiding unit by means of a pin 34 supported in a bracket 35. Similarly, a pin 36 connects the upper end of the link 31 with the aforementioned bracket 32 secured to the plate 19. The upper end of the plant guiding unit 30 is connected by means of a link 37, which is actually a pair of elements, as will be seen from Figure 4, to the plate 19 by means of a bracket 38 and a pin 39. Similarly, the actual connection of the pair of elements constituting the link 37 to the unit 30 is by means of a bracket 40 and a pin 41. A spring 42 is connected at a midpoint of the link 31 at one end and at the other end to the bracket 38 by means of a chain 44 connected to one end of the spring extending through a bayonet slot 43 in the bracket 32. By an adjustment of the chain 44 in the slot 43, a raising and lowering of the outer plant guiding unit is had. The links 31 and 37 are substantially the same length and constitute parallel links, so as to give the plant guiding unit 30 the proper vertical movement with respect to the tractor.

An arm 45 is rigidly connected at one end to the link 31. A rod 46 is pivotally connected at one end to the other end of the arm 45, as at 47. The other end of the rod 46 has an elongated slot 47', in which is received in sliding connection a pin 48 secured to an arm 49 connected in turn to the lever 17. With this arrangement any vertical adjustment of the harvester unit 14 by means of the hand wheel 22 also effects a vertical adjustment of the plant guiding unit 30. The hand wheel 22, by contact of one end of the lever 17, limits the lowermost position of the harvester unit 14, although it may move upwardly from this position within the limits of pivotal movement of the lever 17. Because the plant guiding unit 30 is connected to the lever 17 by means of the rod 46 and arms 45 and 49, there is a definite lowermost position of the unit 30 for a particular adjustment of the hand wheel 22. However, the elongated slot 47 in the rod 46 allows a movement of the unit 30 upwardly from any one lowermost position and independently of any movement of the harvester unit 14.

Figure 2:
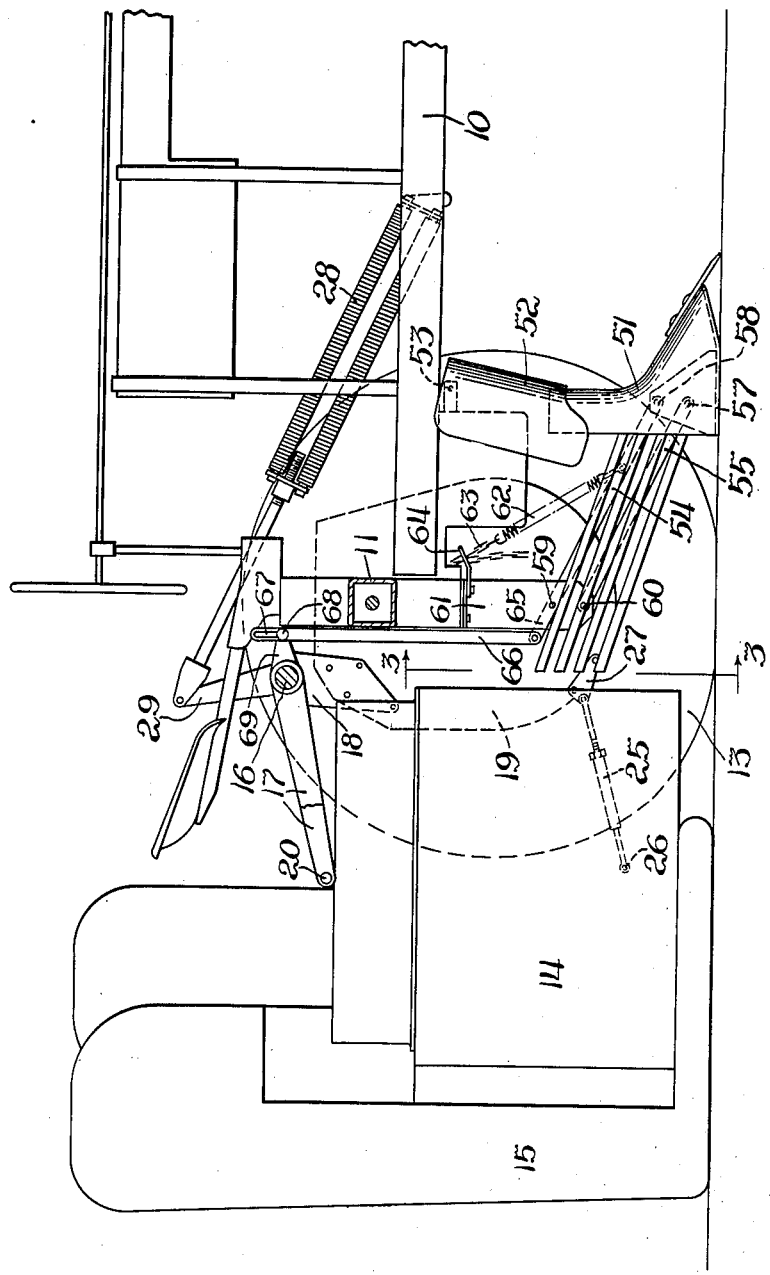
Figure 2 is a similar view, but with a rear wheel of the tractor removed, and shows the connection of an inner plant guide element to the tractor and to the harvester unit.
Figure 3:
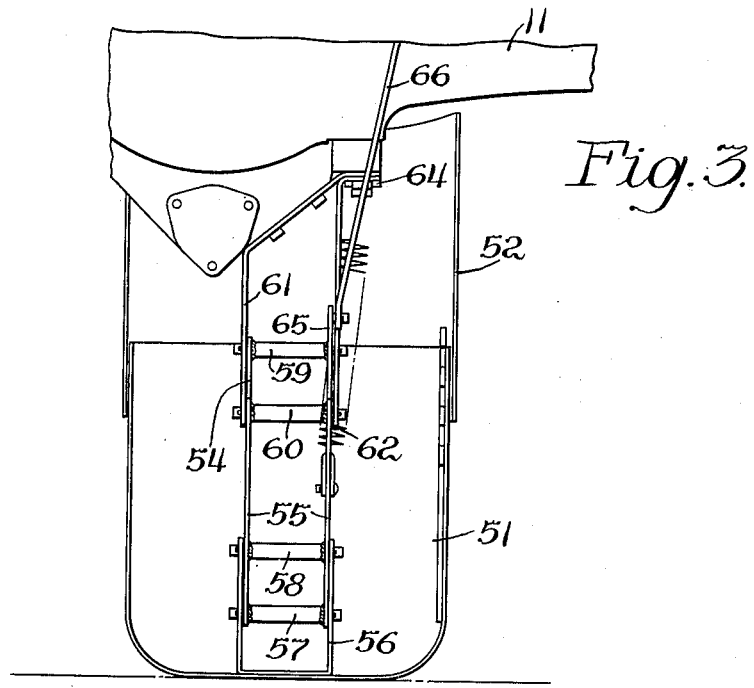
Figure 3 is a view taken along the lines 3—3 of Figure 2, showing the inner plant guiding element; and, Figure 4 is a plan view, showing in detail the mounting of the outer plant guiding unit.

Figure 2 shows the mounting of an inner plant guiding unit 51 on the tractor. A shield 52 is pivotally connected at its upper end by means of a member 53 to the tractor and constitutes in effect an upper extension of the guiding unit 51. Connection of the guiding unit 51 to the tractor is effected by means of parallel links 54 and 55, each of which is actually a pair of elements and is connected to the plant guiding unit by means of a bracket 56 and pins 57 and 58. The links 54 and 55 are connected respectively by pins 59 and 60 supported in a bracket element 61 carried on the plate 19. A spring 62 is connected at one end to an intermediate point of the link 54 and at the other end, by means of a chain 63, to an element 64 having a bayonet slot. The connection of the chain 63 to the element 64 is similar to that of the connection of the chain 44 to the bracket 32 and, for the same reason, the adjustment of the spring and accordingly adjustment of the height of the plant guiding unit 51. The link 54 has an extension 65 beyond the pin 59, to which extension is pivotally connected at one end a rod 66. The rod 66 has at its other end an elongated slot 67 which receives a pin 68 on an arm 69 rigid with the lever 17. By this arrangement adjustment of the plant guiding unit 51 is had similar to adjustment of the unit 30. For a certain setting of the hand wheel 22, the unit 51 has a lowermost position because the rod 66 connected with the unit through link 54 is able to move upwardly only until the pin 68 contacts the end of the slot 67. The slot 67, however, allows a movement of the unit 51 upwardly from any one lowermost position and independently of the harvester unit 14.

It will be seen from the above description that a novel tractor mounted harvester construction has been provided. The harvester unit is positioned rearwardly of the rear axle of the tractor and inner and outer plant guiding units are positioned forwardly of the axle. The units are connected independently of one another both to the tractor and to the harvester unit, so that vertical adjustment of the harvester unit causes a vertical adjustment of the plant guiding unit, but yet there is vertical adjustment of the plant guiding units independently of any vertical movement of the harvester unit. Operation of the harvester will be understood by reference to the aforementioned Edward A. Johnston application. Suffice it to say that the tractor is driven over the ground and rows of plants are acted upon by the plant guiding units 30 and 51 so as to be guided into the harvester unit 14, where the cotton is removed. The plant guiding units are adjusted vertically with respect to the tractor along with the harvester unit. At the same time, the guiding units may have an independent vertical movement so that, in case they strike an obstruction, they are free to rise and allow the obstruction to pass.

The intention is to limit the invention only within the scope of the appended claims.

What is claimed is:

1. In a tractor harvester, said tractor having an extended rear axle structure and said harvester comprising a unit mounted directly at the rear of the rear axle, and inner and outer plant-lifting and guiding means mounted on the tractor and positioned forwardly of the rear axle, the combination therewith of adjusting means connecting the harvester to the tractor for vertical adjustment with respect thereto, means connecting each of the plant-guiding means to the tractor for vertical adjustment with respect thereto, and means interconnecting the adjusting means whereby the plant-guiding means moves at the same time and substantially the same amount as the harvester.

2. In a construction comprising a tractor having a rear axle, a cotton harvesting unit positioned rearwardly thereof, and a plant-guiding means positioned forwardly of the axle, the combination therewith of means connecting the harvesting unit and tractor for vertical movement of the unit, means connecting the tractor and the plant-guiding means for vertical movement of the plant-guiding means, and means interconnecting the connecting means for causing vertical movement of the harvester unit to effect vertical movement of the plant-guiding means.

3. In a construction comprising a tractor having an axle, a harvesting unit, means mounting the harvesting unit at one side of the axle for vertical movement, a plant-guiding unit, means mounting the plant-guiding unit at the other side of the axle for vertical movement, the combination therewith of means interconnecting the units for causing vertical movement of one unit to effect vertical movement of the other unit.

4. In a construction comprising a tractor, a harvesting unit, means mounting the harvesting unit on the tractor for vertical movement, a plant-guiding unit, means mounting the plant-guiding unit on the tractor for vertical movement, the combination therewith of means interconnecting the units for causing vertical movement of one unit to effect vertical movement of the other unit.

5. In a construction comprising a tractor, a harvesting unit, means mounting the harvesting unit on the tractor for vertical movement, a plant-guiding unit, means mounting the plant-guiding unit on the tractor for vertical movement, the combination therewith of means interconnecting the units for causing vertical movement of the harvester unit to effect vertical movement of the plant-guiding unit.

6. In a construction comprising a tractor having an axle, a harvesting unit, means mounting the harvesting unit at one side of the axle for vertical movement, a plant-guiding unit, means mounting the plant-guiding unit at the other side of the axle for vertical movement, the combination therewith of means interconnecting the units for causing vertical movement of the harvesting unit to effect vertical movement of the plant-guiding unit.

7. In a construction comprising a tractor having a rear axle, a harvester unit positioned rearwardly of the axle, a plant-guiding unit positioned forwardly of the axle, the combination therewith of means connecting the harvesting unit to the tractor for vertical movement, adjustable means connecting the aforementioned means to the tractor for limiting the lowermost position of vertical movement of the harvester unit, means connecting the plant-guiding unit to the tractor for vertical movement, means connecting the means between the harvester unit and the tractor and the means between the plant-guiding unit and the tractor for causing vertical movement of the harvester unit to effect vertical movement of the plant-guiding unit.

8. In a construction comprising a tractor having a rear axle, a harvester unit positioned rearwardly of the axle, a plant-guiding unit positioned forwardly of the axle, the combination therewith of means connecting the harvesting unit to the tractor for vertical movement, means connecting the plant-guiding unit to the tractor for vertical movement, means connecting the connecting means for making the vertical position of the plant-guiding unit dependent upon vertical position of the harvester unit and for allowing the plant-guiding unit a vertical movement above the aforesaid vertical position, and adjustable means acting between the tractor and the means connecting the harvesting unit to the tractor for adjusting the lowermost vertical position of the harvester unit and the plant-guiding unit.

9. In combination, a tractor having a rear axle, a vertical plate connected to the axle, a plant-guiding member positioned forwardly of the axle, parallel links connecting respectively upper and lower portions of the plate and the plant-guiding member, and an adjustable tension spring connecting an upper portion of the plate and a mid-portion of the link between the lower portions of the plate and plant-guiding member.

10. In combination, a tractor having a rear axle, a vertical plate connected to the axle, a plant-guiding member positioned forwardly of the axle, and parallel links connecting respectively upper and lower portions of the plate and the plant-guiding member for vertical movement of the plant-guiding member with respect to the tractor.

11. In combination, a tractor having a rear axle, a plant-guiding member positioned forwardly of the axle, parallel links connecting upper and lower points of the plant-guiding member respectively with a pair of units on the tractor substantially above and below the axle, and resilient means connecting the tractor and the plant-guiding member.

12. In a construction comprising a tractor having a rear axle, a harvester unit positioned rearwardly thereof, a lever pivoted at a mid-point on the tractor rearwardly of the rear axle and having one end adjustably connected to the tractor over the axle and the other end connected to the harvester unit, the combination therewith of a plant-guiding unit positioned forwardly of the rear axle, parallel links connecting the plant-guiding unit and the tractor, an arm rigidly connected with one of the links, a member pivotally connected at one end to the arm and having an elongated slot in the other end, and an arm rigid with the lever connected to the harvester unit connected to the member in a sliding connection by means of the elongated slot.

13. In a construction comprising a tractor having a rear axle, a harvester unit positioned rearwardly thereof, a lever pivoted at a mid-point on the tractor rearwardly of the rear axle and having one end adjustably connected to the tractor over the axle and the other end connected to the harvester unit, the combination therewith of a plant-guiding unit positioned forwardly of the rear axle, parallel links connecting the plant-guiding unit and the tractor, one of the links having an extension beyond its point of connection with the tractor, and a member pivotally connected at one end to the link extension and having at the other end an elongated slot receiving in a sliding connection a portion of the lever connected to the harvester unit.

14. In a construction comprising a tractor having a rear axle, a harvester unit positioned rearwardly thereof, a first means pivoted on the tractor and connecting the tractor and the harvester unit, the combination therewith of a plant-guiding unit positioned forwardly of the rear axle, a second means pivoted on the tractor and connecting the tractor and the plant-guiding unit, a third means having a pivotal connection with the second means and a sliding connection with the first means.

15. In a construction comprising a tractor having an axle, a harvesting unit positioned at one side of the axle, a plant-guiding unit positioned at the other side of the axle, the combination therewith of means connecting the harvester unit to the tractor for vertical movement, means connecting the plant-guiding unit to the tractor for vertical movement, and means interconnecting the connecting means for causing vertical movement of one unit to effect vertical movement of the other unit, said last means including lost-motion means whereby the plant-guiding unit has a vertical upward movement independently of the vertical movement of the harvesting unit.

16. In a construction comprising a tractor having an axle, a harvesting unit, means mounting the harvesting unit at one side of the axle for vertical movement, a plant-guiding unit, means mounting the plant-guiding unit at the other side of the axle for vertical movement, the combination therewith of means interconnecting the units for causing vertical movement of the harvester unit to effect vertical movement of the plant-guiding unit and including lost-motion means for allowing an independent vertical movement of the plant-guiding unit.

EDWARD A. JOHNSTON.

DISCLAIMER 2,247,687.—*Edward A. Johnston*, Chicago, Ill. TRACTOR MOUNTED HARVESTER. Patent dated July 1, 1941. Disclaimer filed May 30, 1942, by the assignee, *International Harvester Company*.

Hereby enters this disclaimer to claims 3, 4, 5, 6, 15 and 16.

[*Official Gazette June 30, 1942.*]